US007317465B2

(12) United States Patent
Allen et al.

(10) Patent No.: US 7,317,465 B2
(45) Date of Patent: Jan. 8, 2008

(54) IMAGE DISPLAY SYSTEM AND METHOD

(75) Inventors: Will Allen, Corvallis, OR (US); Edward B. Anderson, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 10/766,641

(22) Filed: Jan. 27, 2004

(65) Prior Publication Data

US 2004/0207815 A1 Oct. 21, 2004

Related U.S. Application Data

(63) Continuation-in-part of application No. 10/632,634, filed on Jul. 31, 2003, now Pat. No. 7,172,288, and a continuation-in-part of application No. 10/242,195, filed on Sep. 11, 2002, now Pat. No. 7,034,811, which is a continuation-in-part of application No. 10/213, 555, filed on Aug. 7, 2002, now Pat. No. 7,030,894.

(51) Int. Cl.

| | |
|---|---|
| ***G09G 5/02*** | (2006.01) |
| ***H04N 9/475*** | (2006.01) |
| ***G02B 26/08*** | (2006.01) |
| ***G06K 9/76*** | (2006.01) |

(52) U.S. Cl. ...................... 345/694; 345/697; 345/698; 353/31; 353/34; 348/511; 348/513; 359/224; 359/317; 382/210; 382/229; 382/310

(58) Field of Classification Search .................. 345/56, 345/204, 694–699; 348/511, 513, 755; 359/224, 359/291, 317; 382/210, 299, 300; 353/31, 353/34, 84

See application file for complete search history.

(56) References Cited

U.S. PATENT DOCUMENTS

| | | | |
|---|---|---|---|
| 4,662,746 | A | 5/1987 | Hornbeck |
| 4,850,685 | A | 7/1989 | Kamakura et al. |
| 4,956,619 | A | 9/1990 | Hornbeck |
| 4,983,032 | A | 1/1991 | Van Den Brandt |
| 5,061,049 | A | 10/1991 | Hornbeck |
| 5,083,857 | A | 1/1992 | Hornbeck |
| 5,105,265 | A | 4/1992 | Sato et al. |
| 5,157,523 | A | 10/1992 | Yamagishi et al. |

(Continued)

FOREIGN PATENT DOCUMENTS

EP 1 001 306 5/2000

(Continued)

OTHER PUBLICATIONS

A. Yasuda et al., "FLC Wobbling for High-Resolution Projectors", Journal of the SID 5/3, 1997, pp. 299-305.

(Continued)

*Primary Examiner*—Henry N Tran

(57) ABSTRACT

A method of displaying an image may include receiving image data for the image, and defining first and second sub-frames of the image. The first and second sub-frames may have corresponding pluralities of image elements, with each image element of the second sub-frame spatially offset an offset distance from a corresponding image element of the first sub-frame. The first sub-frame may be displayed in a first position, and the second sub-frame may be displayed in a second position. Each displayed image element of the second sub-frame may be spatially offset substantially the offset distance from the corresponding displayed image element of the first sub-frame.

23 Claims, 5 Drawing Sheets

U.S. PATENT DOCUMENTS

| | | | | |
|---|---|---|---|---|
| 5,264,879 | A | 11/1993 | Shikama | |
| 5,410,370 | A | 4/1995 | Janssen | |
| 5,490,009 | A | 2/1996 | Venkateswar et al. | |
| 5,689,283 | A * | 11/1997 | Shirochi | 345/698 |
| 5,691,785 | A | 11/1997 | Usui et al. | |
| 5,729,245 | A * | 3/1998 | Gove et al. | 345/84 |
| 5,842,762 | A | 12/1998 | Clarke | |
| 5,897,191 | A | 4/1999 | Clarke | |
| 5,978,518 | A | 11/1999 | Oliyide et al. | |
| 6,025,951 | A | 2/2000 | Swart et al. | |
| RE36,725 | E | 6/2000 | Sonehara et al. | |
| 6,104,375 | A | 8/2000 | Lam | |
| 6,113,239 | A | 9/2000 | Sampsell et al. | |
| 6,141,039 | A | 10/2000 | Poetsch | |
| 6,174,060 | B1 | 1/2001 | Imaoka et al. | |
| 6,184,969 | B1 | 2/2001 | Fergason | |
| 6,191,893 | B1 | 2/2001 | Bradley | |
| 6,219,017 | B1 | 4/2001 | Shimada et al. | |
| 6,239,783 | B1 | 5/2001 | Hill et al. | |
| 6,247,816 | B1 | 6/2001 | Cipolla et al. | |
| 6,309,071 | B1 | 10/2001 | Huang et al. | |
| 6,309,073 | B1 | 10/2001 | Nakayama et al. | |
| 6,313,888 | B1 | 11/2001 | Tabata | |
| 6,384,816 | B1 | 5/2002 | Tabata | |
| 6,393,145 | B2 | 5/2002 | Betrisey et al. | |
| 6,398,364 | B1 | 6/2002 | Bryars | |
| 6,467,910 | B1 | 10/2002 | Sato | |
| 6,481,852 | B2 | 11/2002 | Osaka | |
| 6,507,326 | B2 | 1/2003 | Manabe et al. | |
| 6,532,044 | B1 | 3/2003 | Conner et al. | |
| 6,657,603 | B1 * | 12/2003 | Demetrescu et al. | 345/32 |
| 6,816,141 | B1 * | 11/2004 | Fergason | 345/88 |
| 2002/0033992 | A1 | 3/2002 | Den Bossche et al. | |
| 2002/0171809 | A1 | 11/2002 | Kurtz et al. | |
| 2003/0090597 | A1 * | 5/2003 | Katoh et al. | 348/744 |
| 2005/0104908 | A1 * | 5/2005 | Brown Elliot | 345/694 |

FOREIGN PATENT DOCUMENTS

| | | |
|---|---|---|
| JP | 60-132476 | 7/1985 |
| JP | 63-292880 | 11/1988 |
| JP | 64-47180 | 2/1989 |
| JP | 2-216187 | 8/1990 |
| JP | 2-250081 | 10/1990 |

OTHER PUBLICATIONS

D. Chen, "Display Resolution Enhancement With Optical Scanners", Applied Optics, vol. 40, No. 5, Feb. 10, 2001, pp. 636-643.

T. Tokita et al., "P-108: FLC Resolution-Enhancing Device for Projection Displays", SID 02 Digest, 2002, pp. 638-641.

Webpage "Profile: Emerging Technology" (www.newscenter.philips.com), 2002.

Webpage "Four Philips LCOS Televisions" (www.bluefi.co.uk).

Webpage "Projection Display Technology" (www.extremetech.com).

D. Dewald et al. "Sequential Color Recapture and Dynamic Filtering: A Method of Scrolling Color", SID 00 Digest, pp. 1-4.

* cited by examiner

Fig. 1
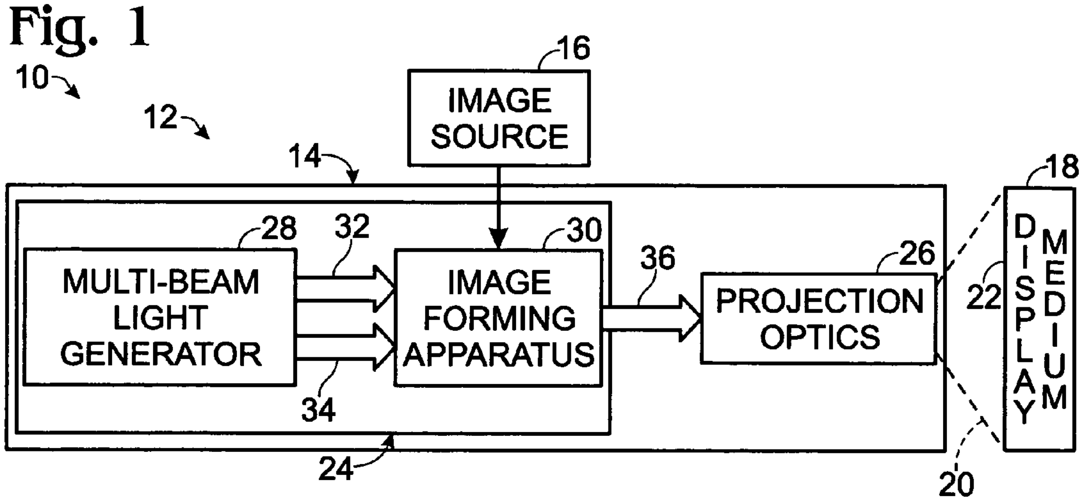
Fig. 4
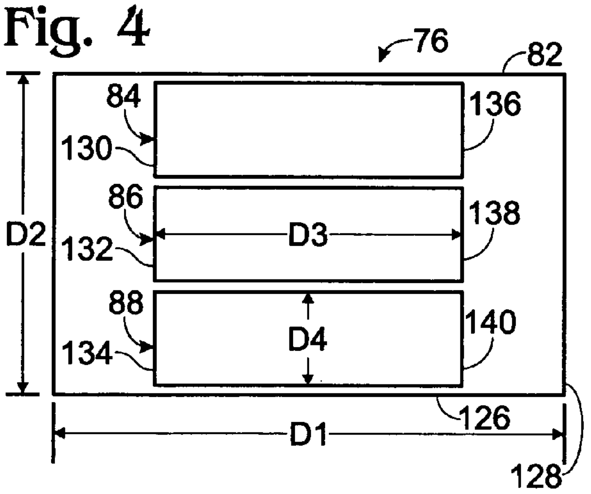
Fig. 5
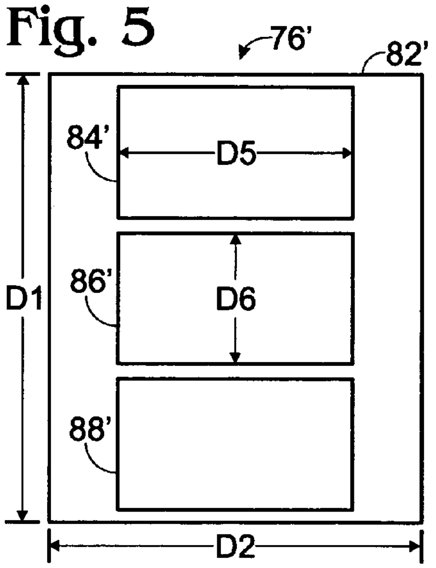
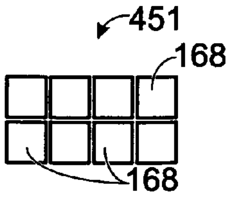
Fig. 7A
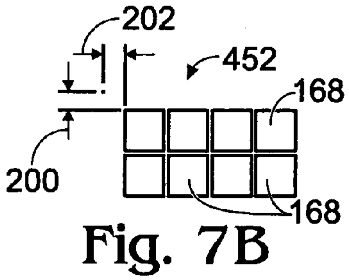
Fig. 7B
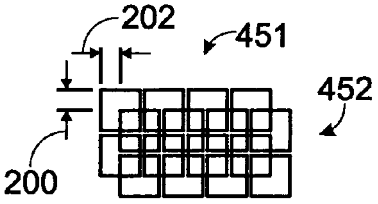
Fig. 7C

210

(WITHOUT PROCESSING)

212

(WITH TWO-POSITION PROCESSING)

214

(WITHOUT PROCESSING)

216

(WITH FOUR-POSITION PROCESSING)

IMAGE DISPLAY SYSTEM AND METHOD

CROSS-REFERENCE TO RELATED APPLICATIONS

This application is a continuation-in-part of U.S. patent application Ser. No. 10/242,195, filed on Sep. 11, 2002 U.S. Pat. No. 7,034,811, issued Apr. 25, 2006, which is a continuation-in-part of U.S. patent application Ser. No. 10/213,555, filed on Aug. 7, 2002 U.S. Pat. No. 7,030,894, issued Apr. 18, 2006. This application is also a continuation-in-part of U.S. patent application Ser. No. 10/632,634, filed on Jul. 31, 2003 U.S. Pat. No. 7,172,288, issued Feb. 6, 2007. This application is related to U.S. patent application Ser. No. 10/242,545, filed on Sep. 11, 2002 U.S. Pat. No. 6,963,319, issued Nov. 8, 2005. All of these applications are assigned to the assignee of the present invention, and are incorporated herein by reference.

BACKGROUND

Image display devices may be used to project or display a still or video image, or to enable the image to be viewed simultaneously by a large or small audience. Such display devices are intended to produce image color and/or brightness as faithfully as possible. However, the quality of the projected image often may be enhanced by, among other factors, a brighter light source. The brightness of the light source used may be particularly important when projecting an image in the presence of even moderate ambient light levels.

Projection engines typically modulate red, green, and blue light to produce a projected image, where the red, green, and blue light is derived from a white light source. For example, the white light produced by the light source may be focused and directed sequentially onto color filters, such as a color wheel or color drum. A color wheel is typically a rapidly rotating color filter wheel interposed between the light source and an image-forming element, and typically includes segments having different light-filtering properties. A typical color wheel may include transmissive or reflective filter segments, such as a red filter segment, a green filter segment, and a blue filter segment. As the color wheel is rapidly rotated, colored light may be sequentially projected onto an image-forming apparatus.

A displayed image may be produced by addressing an array of individual image elements. These image elements may also be known as picture elements, pixels, or pels. A resolution of the displayed image may be defined as the number of image elements in a given area. The resolution of a displayed image may be affected by the physical structure of a display device, as well as the image data processed by the display device and used to produce the displayed image.

BRIEF DESCRIPTION OF THE DRAWINGS

FIG. 1 is a block diagram of an imaging system according to an embodiment of the invention.

FIG. 4 is a diagram illustrating a spatial light modulator according to an embodiment of the invention.

FIG. 5 is a diagram illustrating a spatial light modulator according to another embodiment of the invention.

FIGS. 7A-7C are schematic illustrations of processing and displaying a frame of an image according to an embodiment of the present invention.

DETAILED DESCRIPTION

Figures 2, 8A, 8B, 8C, 11A, 11B, 11C, 11D, 11E:
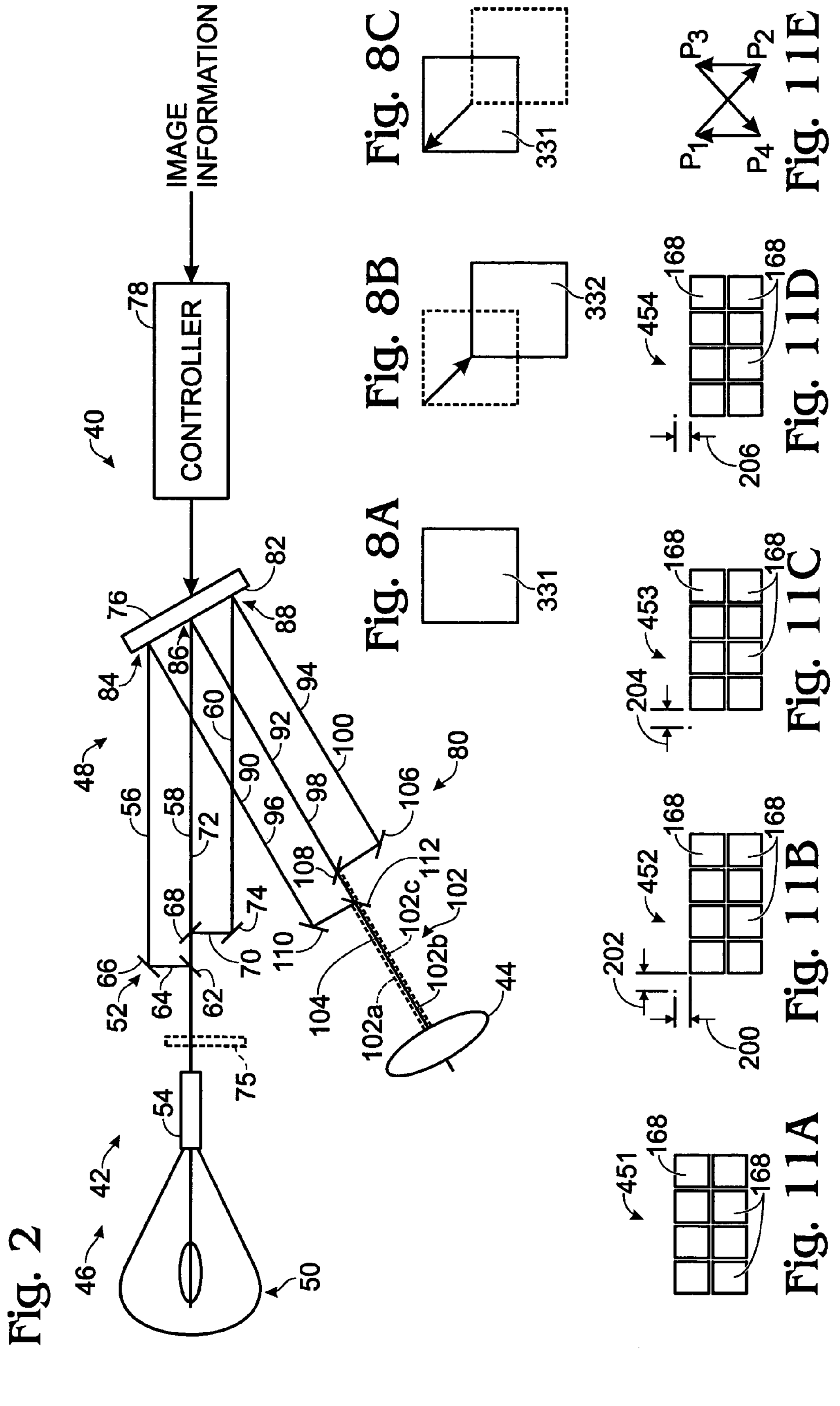
FIG. 2 is a general schematic of a projector according to an embodiment of the invention.
FIGS. 8A-8C are schematic illustrations of displaying a pixel with an image display system according to an embodiment of the present invention.
FIGS. 11A-11E are schematic illustrations of processing and displaying a frame of an image according to an embodiment of the present invention.

Referring now to the drawings, and more particularly to FIG. 1, there is illustrated a display device 10 that may be constructed according to an embodiment of the invention. Display device 10 may include an imaging system 12 that produces a displayed image for viewing, or any device or apparatus that provides modulation of light or may be controlled to provide modulation of light according to image information. Imaging system 12 may include a projector 14, an image source 16, and a display medium 18. Projector 14 may be a display device configured to produce a projected image light band 20 for displaying a still or moving image 22 on a front or rear surface of display medium 18. Display medium 18 may be a viewing surface, screen or other medium of display. Although the imaging system shown is represented as a front projection system, a rear or other projection system may also be used. Image source 16 may be any source of image information, such as a charge-coupled device (CCD), a memory device, a computer, a communication link, whether wired or wireless, an imaging device, a network (whether local or remote), or other device or apparatus configured to provide or derive image information. Image information may be any characteristic, feature or quality that is representative of an image and may be obtained or derived from an image source, whether in the form of electrical, electromagnetic, analog or digital signals, data, or in some other form.

Projector 14 may include a light engine 24 and projection optics 26. Light engine 24 may be a display device that includes a light generator 28 and an image-forming apparatus 30. Light generator 28 may produce a plurality of bands of light, such as light bands 32 and 34. Light bands 32 and 34 may be any transmissions of light that are spatially distinguishable or capable of being spatially distinguished when received by image-forming apparatus 30. That is, the light bands may be formed as a single beam having distinguishable light-band components, or may be separate beams that are transmitted along separate, overlapping, parallel, or transverse paths. The light bands may be of the same, overlapping, or separate spectral bandwidths, and may have the same or different luminance or chrominance properties or characteristics.

Image-forming apparatus 30 may be a display device that modulates (temporally, spatially, or temporally and spatially) light bands 32 and 34 according to image information received from image source 16. Apparatus 30 may produce a modulated light band 36, which represents a composite of modulated light bands 32 and 34. Projection optics 26 may optically modify modulated light band 36 and direct it, as projected light band 20, toward display medium 18.

Referring now to FIG. 2, a display device may be embodied as a projector 40. Projector 40 may include a light engine 42 and projection optics 44. Light engine 42 may include a light generator 46 and an image-forming apparatus 48. A light generator may be any device that produces a plurality of bands of light. Light generator 46 may include a light source 50 and an optical separator 52. Light source 50 may be configured to generate multi-spectral light, which may be light having more than a single wavelength or a narrow range of wavelengths. The light source may be a broad spectrum light source, a full-spectrum light source, or a white-light source, such as may be provided, for example, by metal halide lamps, xenon lamps, halogen lamps, mercury vapor lamps, plasma lamps, and incandescent lamps. An integrating rod 54 may integrate the light produced by the light source, with the output of the integrated light being directed to optical separator 52.

An optical separator may be any device that optically separates a plurality of light bands from an incident light band. Optical separator 52 may be configured to receive the multi-spectral light generated by light source 50, and separate it into multiple bands, such as bands 56, 58 and 60 based on the wavelength or other characteristic of the light. That is, the broad spectrum light from the light source may be separated into multiple distinct beams of light that are physically separated in space, where each beam includes light that is part of a more narrow range of wavelengths than that produced by the multi-spectral light source. For example, light bands 56, 58 and 60 may be, respectively, red, green and blue light bands, or in some embodiments, the light bands may all be of the same color or white.

Optical separator 52 may include a first angled dichroic mirror 62 that reflects, in this example, the red component of light along an optical path 64, and passes the other two components of color, i.e., the green and blue components. Optical path 64 may be folded by a mirror 66 toward image-forming apparatus 48. The blue component of light may be reflected by a second angled dichroic mirror 68 along an optical path 70, and pass the green component along an optical path 72, also directed toward image-forming apparatus 48. Optical path 70 may be folded by a mirror 74 toward the image-forming apparatus.

In the illustrated implementation, dichroic mirrors 62 and 68 may each be oriented at angles of incidence of about 45 degrees relative to a central optical path 72. The dichroic mirrors may reflect color components of light at the ends of the primary color spectrum in opposed directions. The remaining color component of light, i.e., green, may pass to the image-forming apparatus without being reflected.

As was mentioned, in some embodiments, the light bands may all be of the same color or white. In this case, a color device 75 may be used, such as a color wheel or color cylinder that filters multi-spectral light from light source 50. The color device 75 may then produce a monochromatic light that may change sequentially between red, green, blue and white, or other color sequence selected. In such a case, spectral separators, such as dichroic mirrors, may not be desired, and devices 62 and 68 may be monochromatic beam splitters, or the light may be directed as a single broad beam, rather than as separate light bands.

Image-forming apparatus 48 may include a spatial light modulator 76, a controller 78, and an optical combiner 80. Spatial light modulator 76 may include any device or apparatus configured to receive the light from the light generator, and form images by selectively manipulating the light. For example, the spatial light modulator may include a transmissive image-forming element, such as a liquid crystal display panel (LCD), among others. Alternatively, the image-forming element may function as a reflective image-forming element, such as digital micro-mirror device (DMD), a grating light valve (GLV), or liquid crystal on silicon (LCOS) device, among others.

Spatial light modulator 76 may include an array 82 of light modulating elements, examples of which are described further with reference to FIGS. 4 and 5, may be configured to be impinged by substantially stationary light bands 56, 58 and 60 on corresponding substantially stationary image regions 84, 86 and 88.

Controller 78 may be configured to control spatial light modulator 76 to modulate image regions 84, 86 and 88 in response to image information received from an image source, such as has been described. As a result, non-scanning incident light bands 56, 58 and 60 may be modulated, and directed as respective modulated light bands 90, 92 and 94 along corresponding light paths 96, 98 and 100.

Optical combiner 80 may combine component modulated image light bands 90, 92 and 94 to form a composite image light band 102 directed along a light path 104, for projection by projection optics 44. In particular, a mirror 106 may fold blue light band 94 toward light path 98 containing green light band 92. A third dichroic mirror 108 combines the blue light band with the green light band on light path 98. Similarly, a mirror 110 may fold red light band 90 toward light path 98. The red light band is combined with the green and blue light bands on path 98 by a fourth dichroic mirror 112, to form composite image light band 102. Light band 102 may accordingly be considered to be comprised of sub-light bands 102*a*, 102*b* and 102*c* derived from light bands 90, 92 and 94, respectively. As is discussed further below, in some embodiments, these sub-light bands may be offset relative to each other, such as for imaging spatially offset sub-frames of an image, such as by the positioning of the optical elements. In embodiments in which monochromatic light is transmitted from the image regions of the spatial light modulator, the third and fourth dichroic mirrors may be replaced with monochromatic beam splitters.

As a display device, projector 40 may include additional optics, spatial light modulators, scanning mirrors, focusing devices, color-generation devices, controllers, etc.

Figure 3:
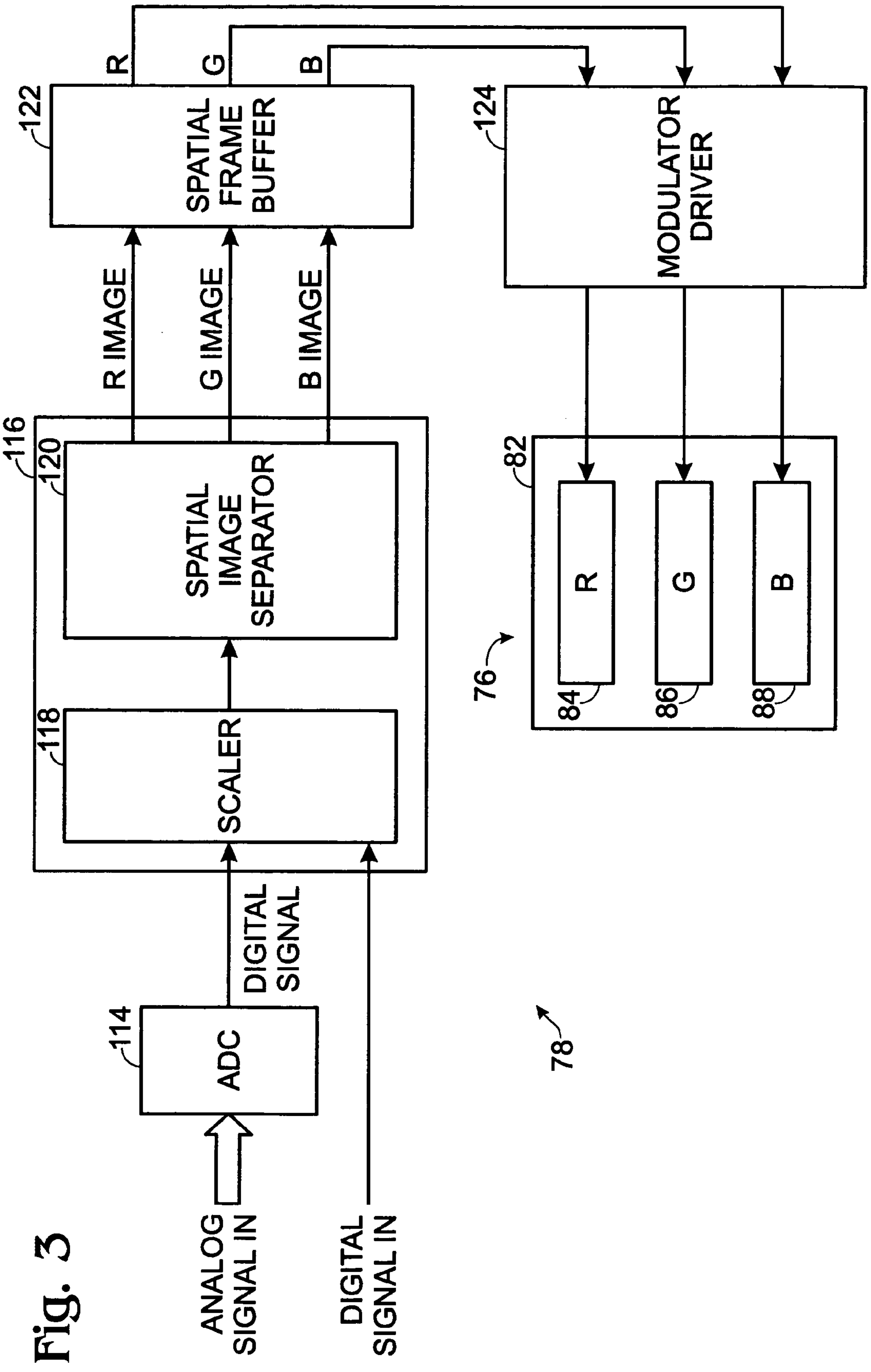
FIG. 3 is a schematic of an image-forming apparatus according to an embodiment of the invention.

Referring now to FIG. 3, an example of a controller 78 and spatial light modulator 76 is illustrated. Controller 78 may include hardware, software, firmware, or a combination of these, and may be included in a computer, computer server, or other microprocessor-based system capable of performing a sequence of logic operations. In addition, processing can be distributed with individual portions being implemented in separate system components.

When image information is received as an analog signal, the controller may include an analog-to-digital converter (ADC) 114 that may convert the analog signal into a digital signal. A received or converted digital signal may be input into a spatial image generator 116. The spatial image generator may include a scaler 118 and a spatial image separator 120. The order in which these functions are performed may be reversed from that shown, or these functions may be combined. The scaler may scale, alter, crop or otherwise adjust received digital image information to conform it to a fixed image region within an array of modulating elements, such as a region 84, 86 or 88 within array 82 of spatial light modulator 76.

Spatial image separator 120 may assign received image information associated with a desired image to a selected image region. For example, image data associated with red, green and blue component images may be assigned to respective fixed image regions 84, 86 and 88. The image data associated with each image region also may be considered a sub-frame. Correspondingly, the composite image data for an image from which the sub-frames are formed may be considered to be a frame of the image. Optionally, image data corresponding to spatially offset sub-frames of an image may be assigned to respective image regions according to the color of light directed onto each region. The respective scaled and assigned image data may then be transmitted along parallel or serial data paths from the spatial image generator to a spatial frame buffer 122. The data is stored in the frame buffer and output synchronously to a spatial light modulator driver 124. The sets of image data then may be input into spatial light modulator 76 to control operation of the corresponding image regions, such as image regions 84, 86 and 88 for modulating three colored light bands incident on the image regions.

An array of modulating elements may be any size and shape desired. Further, the size, shape and number of image regions within an array of modulating elements may be a matter of design choice. FIGS. 4 and 5 illustrate two configurations for arranging three rectangular image regions on a rectangular array of modulating elements of a spatial light modulator. As shown in FIG. 4, array 82 of modulating elements may have a long edge 126 and a short edge 128. Long edge 126 may have a length D1 and short edge 128 may have a length D2. Length D1 may be related to length D2 by a ratio that approximates a selected aspect ratio. For example, an aspect ratio of 4:3 used for many computer and broadcast television applications may be provided by an array that is 1600 pixels by 1200 pixels. An array that is 1280 pixels by 1024 pixels has a ratio of 5:4, and an array that is 2550 pixels by 1500 pixels has a ratio of 16:9. The term “pixel” as a unit corresponds to an image picture element that may correspond to or be related to the modulating elements of the array. Other aspect ratios or array configurations may also be used.

Within array 82 are a plurality of image regions, such as regions 84, 86 and 88. As mentioned, the image regions may be of the same or different sizes and shapes. In the examples illustrated, the image regions are of the same size. Image regions 84, 86 and 88 may have a width D3 and a height D4. In the case where array 82 has a size of 1280 pixels by 1024 pixels, the image regions may have a width D3 of 589 pixels and a height D4 of 330 pixels. These dimensions approximate an aspect ratio of 16:9 that may be associated with other image formats, such as may be used in cinematography. Image regions 84, 86 and 88, being of the same size, may be combined by spectral combiner 80 with corresponding pixels overlapping or aligned without adjusting the relative scales of the images. The image regions further may have end edges that are aligned along an axis, such as a vertical axis as viewed in the figure. That is, image regions 84, 86 and 88 may have respective left edges 130, 132 and 134 that are aligned, and respective right edges 136, 138 and 140 that are aligned. Accordingly, recombining the component images may be provided by effectively shifting the images vertically to a point where they are coincident.

Optionally, in embodiments in which spatially offset sub-frames are being produced, the image regions may be de-aligned on the array of modulating elements, such as being offset horizontally, vertically or a combination of horizontally and vertically, to facilitate display of the sub-frames in the desired spatial relationship.

FIG. 5 illustrates an additional relative orientation of image regions 84', 86' and 88' and an array 82' of modulating elements of a spatial light modulator 76'. In this orientation, the short dimension D2 of the array may extend horizontally and the long dimension D1 may extend vertically. With this configuration, image regions 84', 86' and 88' may have a width D5 of 729 pixels and a height D6 of 410 pixels, if a 16:9 aspect ratio is desired.

The references to dimensions as widths and heights are used for convenience, as they apply to the arrays and image regions oriented as shown. Other orientations may also be used.

Although display devices are described that provide for producing a composite color image formed of red, green and blue component images, other component images or sub-frames may be used. Additionally, a spatial light modulator may produce more or fewer images, and those images may be partially or completely combined for display or used separately. The images produced by the spatial light modulator may be related or unrelated.

The image resolution provided by a display system using a spatial light modulator may depend on the number of modulating elements in the spatial light modulator used to modulate an image. The resolution, then, may depend on the spatial light modulator used. The highest resolution that may be available for a given spatial light modulator may be when the entire array of modulating elements of the spatial light modulator are used to create a single image at a time. With the display devices described previously, a spatial light modulator is used to produce a plurality of images concurrently. This may result in reduced resolution for each image compared to the resolution that would be realized if the entire spatial light modulator were used for each image. Since commercially available spatial light modulators are generally less expensive than custom made spatial light modulators, reduced resolution may result from using a commercially available spatial light modulator to produce a plurality of images.

Figures 6, 12A, 12B, 12C, 12D, 12E:
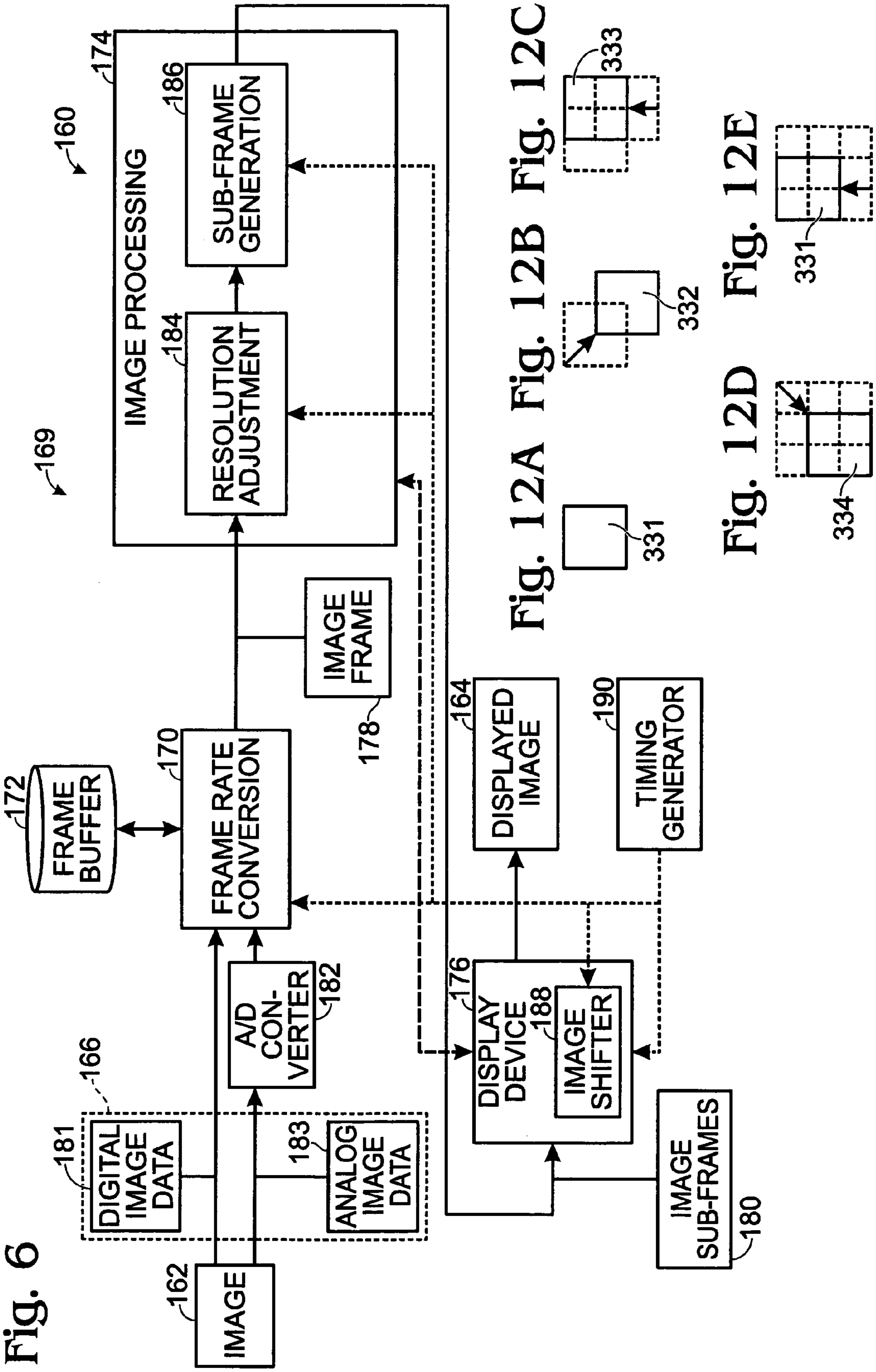
FIG. 6 is a block diagram illustrating one embodiment of an image display system.
FIGS. 12A-12E are schematic illustrations of displaying a pixel with an image display system according to an embodiment of the present invention.

FIG. 6 illustrates one embodiment of an image display system 160 that may be used to effectively increase image resolution, and may be incorporated in the display devices described with reference to FIGS. 1-5. The description that follows, for simplicity of presentation, is limited to a single image. This description, then, may apply to each image produced by a spatial light modulator as described. Image display system 160 facilitates processing of an image 162 to create a displayed image 164. Image 162 is defined to include any pictorial, graphical, and/or textural characters, symbols, illustrations, and/or other representation of information. Image 162 is represented, for example, by image data 166. Image data 166 may include individual image elements, such as picture elements or pixels, of image 162. While one image is illustrated and described as being processed by image display system 160, it is understood that a plurality or series of images may be processed and displayed by image display system 160, such as video images.

In some embodiments, image display system 160 includes a controller 169 and a display device 176. Controller 169 may include a frame rate conversion unit 170, an image frame buffer 172 and an image processing unit 174. As described below, frame rate conversion unit 170 and image frame buffer 172 may receive and buffer image data 166 for image 162 to create an image frame 178 for image 162. In addition, image processing unit 174 may process image frame 178 to define one or more image sub-frames 180 for image frame 178. Display device 176 may temporally and spatially project image sub-frames 180 to produce displayed image 164. Display system 160 may correspond to projector 14 described with reference to FIG. 1.

Image display system 160, including frame rate conversion unit 170 and/or image processing unit 174, may include hardware, software, firmware, or a combination of these. In some embodiments, one or more components of image display system 160, including frame rate conversion unit 170 and/or image processing unit 174, are included in a computer, computer server, or other microprocessor-based system capable of performing a sequence of logic operations. In addition, processing can be distributed throughout a system with individual portions being implemented in separate system components.

Image data 166 may include digital image data 181 or analog image data 183. To process analog image data 183, image display system 160 may include an analog-to-digital (A/D) converter 182. As such, A/D converter 182 may convert analog image data 183 to digital form for subsequent processing. Thus, image display system 160 may receive and process digital image data 181 and/or analog image data 183 for image 162.

Frame rate conversion unit 170 may receive image data 166 for image 162 and buffer or store image data 166 in image frame buffer 172. More specifically, frame rate conversion unit 170 may receive image data 166 representing individual image elements, lines, or fields of image 162 and buffer image data 166 in image frame buffer 172 to create image frame 178 for image 162. Image frame buffer 172 may buffer image data 166 by receiving and storing all of the image data for image frame 178 and frame rate conversion unit 170 may create image frame 178 by subsequently retrieving or extracting all of the image data for image frame 178 from image frame buffer 172. As such, image frame 178 may include a plurality of individual image elements, lines or fields of image data 166 representing an entirety of image 162. Thus, image frame 178 may include a plurality of columns and a plurality of rows of individual pixels representing image 162.

Frame rate conversion unit 170 and image frame buffer 172 can receive and process image data 166 as progressive image data and/or interlaced image data. With progressive image data, frame rate conversion unit 170 and image frame buffer 172 can receive and store sequential fields of image data 166 for image 162. Thus, frame rate conversion unit 170 may create image frame 178 by retrieving the sequential fields of image data 166 for image 162. With interlaced image data, frame rate conversion unit 170 and image frame buffer 172 receive and store odd fields and even fields of image data 166 for image 162. For example, all of the odd fields of image data 166 are received and stored and all of the even fields of image data 166 are received and stored. As such, frame rate conversion unit 170 de-interlaces image data 166 and creates image frame 178 by retrieving the odd and even fields of image data 166 for image 162.

Image frame buffer 172 may include memory for storing image data 166 for one or more image frames 178 of respective images 162. Thus, image frame buffer 172 may constitute a database of one or more image frames 178. Examples of image frame buffer 172 include non-volatile memory (e.g., a hard disk drive or other persistent storage device) and may include volatile memory (e.g., random access memory (RAM)).

By receiving image data 166 at frame rate conversion unit 170 and buffering image data 166 with image frame buffer 172, input timing of image data 166 can be decoupled from a timing requirement of display device 176. More specifically, with image data 166 for image frame 178 is received and stored by image frame buffer 172, image data 166 can be received as input at any rate. As such, the frame rate of image frame 178 can be converted to conform to the timing requirements of display device 176. Thus, image data 166 for image frame 178 can be extracted from image frame buffer 172 at a frame rate of display device 176 suitable for producing a plurality of images, including sub-frames of images, concurrently and/or sequentially, as described for controller 78 depicted in FIG. 3.

In some embodiments, image processing unit 174 includes a resolution adjustment unit 184 and a sub-frame generation unit 186. As described below, resolution adjustment unit 184 receives image data 166 for image frame 178 and adjusts a resolution of image data 166 for display on display device 176, and sub-frame generation unit 186 generates a plurality of image sub-frames 180 for image frame 178. More specifically, image processing unit 174 receives image data 166 for image frame 178 at an original resolution and processes image data 166 to match the resolution of display device 176, examples of which have been described. For example, image processing unit 174 increases, decreases, and/or leaves unaltered the resolution of image data 166 so as to match the resolution of display device 176. Thus, by matching the resolution of image data 166 to the resolution of display device 176, display device 176 can display image data 166. Accordingly, with image processing unit 174, image display system 160 can receive and display image data 166 of varying resolutions.

In some embodiments, image-processing unit 174 increases a resolution of image data 166. For example, image data 166 may be of a resolution less than that of display device 176. More specifically, image data 166 may include lower resolution data, such as 400 pixels by 300 pixels, and display device 176 may support higher resolution data, such as 800 pixels by 600 pixels. As such, image processing unit 174 processes image data 166 to increase the resolution of image data 166 to the resolution of display device 176. Image processing unit 174 may increase the resolution of image data 166 by, for example, pixel replication, interpolation, and/or any other resolution synthesis or generation technique.

In some embodiments, image processing unit 174 decreases a resolution of image data 166. For example, image data 166 may be of a resolution greater than that of display device 176. More specifically, image data 166 may include higher resolution data, such as 1600 pixels by 1200 pixels, and display device 176 may support lower resolution data, such as 800 pixels by 600 pixels. As such, image processing unit 174 processes image data 166 to decrease the resolution of image data 166 to the resolution of display device 176. Image processing unit 174 may decrease the resolution of image data 166 by, for example, sub-sampling, interpolation, and/or any other resolution reduction technique.

Sub-frame generation unit 186 may receive and process image data 166 for image frame 178 to define a plurality of image sub-frames 180 for image frame 178. If resolution adjustment unit 184 has adjusted the resolution of image data 166, sub-frame generation unit 186 receives image data 166 at the adjusted resolution. The adjusted resolution of image data 166 may be increased, decreased, or the same as the original resolution of image data 166 for image frame 178. Sub-frame generation unit 186 may generate image sub-frames 180 with a resolution that matches the resolution of display device 176. Each of image sub-frames 180 may be of an area equal to image frame 178 and each may include a plurality of columns and a plurality of rows of individual pixels representing a subset of image data 166 of image 162 and have a resolution that matches the resolution of display device 176.

Each image sub-frame 180 may include a matrix or array of pixels for image frame 178. Image sub-frames 180 may be spatially offset from each other such that each image sub-frame 180 includes different pixels and/or portions of pixels. As such, image sub-frames 180 may be offset from each other by a vertical distance and/or a horizontal distance, as described below.

Display device 176 may receive image sub-frames 180 from image processing unit 174 and sequentially display image sub-frames 180 to create displayed image 164. More specifically, for image sub-frames 180 that are spatially offset from each other, display device 176 may display image sub-frames 180 in different positions according to the spatial offset of image sub-frames 180, as described below. As such, display device 176 may display image sub-frames 180 of image frame 178 sequentially or concurrently to create displayed image 164. Accordingly, display device 176 may display one entire sub-frame 180 for image frame 178 at one time or a plurality of entire sub-frames 180 at a time. Accordingly, in some embodiments, display device 176 may display a sequence of a plurality of concurrently displayed sub-frames to display an image corresponding to an image frame.

In some embodiments, display device 176 may complete one cycle of displaying image sub-frames 180 for image frame 178. Also, display device 176 may display image sub-frames 180 so as to be spatially and/or temporally offset from each other. In some embodiments, display device 176 may optically steers each image sub-frame 180 to a respective offset position to create displayed image 164. As such, individual display elements, such as a modulating element of a spatial light modulator, of display device 176 may be addressed to multiple locations.

In one embodiment, display device 176 includes an image shifter 188. Image shifter 188 spatially alters or offsets the position of image sub-frames 180 as displayed by display device 176. More specifically, image shifter 188 varies the position of display of image sub-frames 180, as described below, to produce displayed image 164. In some embodiments, the image sub-frames are varied by a lens, mirror or other optical element in a light path. When the sub-frames are projected serially along a common light path (such as light path 104 of FIG. 2) with the other sub-frames, the optical element may be moved to vary the position of the displayed image.

In other embodiments, the sub-frames may travel along separate light paths (such as light paths 96, 98 and 100 of FIG. 2). In this latter instance, instead of dividing the color bands spatially, the sub-frames may be divided spatially, whereby different sub-frames corresponding to a frame are imaged concurrently on the spatial light modulator. With separate sub-frame light paths, the associated optics may be fixed with relative offsets, so that they combine in a downstream light path or on a display surface in the respective offset positions. As an example, referring again to projector 40 depicted in FIG. 2, an offset may be provided by any of mirrors 106, 108, 110 and 112.

As has been discussed, display device 176 includes a light modulator for modulation of incident light. The light modulator includes, for example, a plurality of micro-mirror devices arranged to form an array of micro-mirror devices. As such, each micro-mirror device constitutes one cell or display element of display device 176. Display device 176 may form part of a display, projector, or other imaging system.

In some embodiments, image display system 160 includes a timing generator 190. Timing generator 190 may communicate, for example, with frame rate conversion unit 170, image processing unit 174, including resolution adjustment unit 184 and sub-frame generation unit 186, and display device 176, including image shifter 188. As such, timing generator 190 may synchronize buffering and conversion of image data 166 to create image frame 178, processing of image frame 178 to adjust the resolution of image data 166 to the resolution of display device 176 and generate image sub-frames 180, and display and positioning of image sub-frames 180 to produce displayed image 164. Accordingly, timing generator 190 may control timing of image display system 160 such that entire sub-frames of image 162 are temporally and/or spatially displayed by display device 176 as displayed image 164.

Resolution Enhancement

In some embodiments, as illustrated in FIGS. 7A and 7B, image processing unit 174 may define a plurality of image sub-frames 180 for image frame 178. More specifically, image processing unit 174 may define a first sub-frame 451 and a second sub-frame 452 for image frame 178. As such, first sub-frame 451 and second sub-frame 452 each include a plurality of columns and a plurality of rows of individual pixels 168 of image data 166. Thus, first sub-frame 451 and second sub-frame 452 each may constitute an image data array or pixel matrix of a subset of image data 166.

In some embodiments, as illustrated in FIG. 7B, second sub-frame 452 may be offset from first sub-frame 451 by a vertical distance 200 and a horizontal distance 202. As such, second sub-frame 452 may be spatially offset from first sub-frame 451 by a predetermined distance. In one illustrative embodiment, vertical distance 200 and horizontal distance 202 may each be approximately one-half of one pixel.

As illustrated in FIG. 7C, display device 176 may display first sub-frame 451 in a first position and display second sub-frame 452 in a second position spatially offset from the first position. More specifically, in this example, display device 176 may shift display of second sub-frame 452 relative to display of first sub-frame 451 by vertical distance 200 and horizontal distance 202. As such, pixels of first sub-frame 451 may overlap pixels of second sub-frame 452. In some embodiments, display device 176 completes one image cycle by displaying first sub-frame 451 in the first position and displaying second sub-frame 452 in the second position for image frame 178. The sub-frames may be displayed sequentially or concurrently. Thus, second sub-frame 452 is spatially displaced relative to first sub-frame 451.

FIGS. 8A-8C illustrate displaying a pixel 331 from first sub-frame 451 in the first position and displaying a pixel 332 from second sub-frame 452 in the second position. More specifically, FIG. 8A illustrates display of pixel 331 from first sub-frame 451 in the first position, FIG. 8B illustrates display of pixel 332 from second sub-frame 452 in the second position (with the first position being illustrated by dashed lines), and FIG. 8C illustrates display of pixel 331 from first sub-frame 451 in the first position (with the second position being illustrated by dashed lines).

Figure 9:
FIG. 9 is a simulation of an enlarged image portion produced without processing by an image display system according to an embodiment of the present invention.
Figure 10:
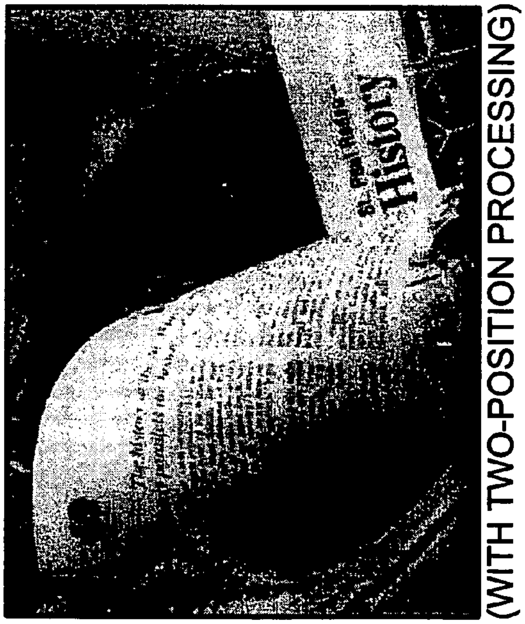
FIG. 10 is a simulation of an enlarged image portion produced with processing by an image display system according to an embodiment of the present invention.

FIGS. 9 and 10 illustrate enlarged image portions produced from the same image data without and with, respectively, image processing by image display system 160 using two sub-frames for each frame, as just described. More specifically, FIG. 9 illustrates an enlarged image portion 210 produced without processing by image display system 160. As illustrated in FIG. 9, enlarged image portion 210 appears pixilated with individual pixels being readily visible. In addition, enlarged image portion 210 is of a lower resolution.

FIG. 10, however, illustrates an enlarged image portion 212 produced with processing by image display system 160. As illustrated in FIG. 10, enlarged image portion 212 does not appear as pixilated as enlarged image portion 210 of FIG. 9. Thus, image quality of enlarged image portion 212 is enhanced with image display system 160. More specifically, resolution of enlarged image portion 212 is improved or increased compared to enlarged image portion 210.

In some illustrative embodiments, enlarged image portion 212 is produced using two-position processing including a first sub-frame and a second sub-frame, as described above. Thus, twice the amount of pixel data is used to create enlarged image portion 212 as compared to the amount of pixel data used to create enlarged image portion 210. Accordingly, with two-position processing, the resolution of enlarged image portion 212 is increased relative to the resolution of enlarged image portion 210 by a factor of approximately 1.4 or the square root of two.

In other embodiments, as illustrated in FIGS. 11A-11D, image processing unit 174 may define a plurality of image sub-frames 180 for image frame 178. More specifically, image processing unit 174 may define a first sub-frame 451, a second sub-frame 452, a third sub-frame 453, and a fourth sub-frame 454 for image frame 178. As such, first sub-frame 451, second sub-frame 452, third sub-frame 453, and fourth sub-frame 454 each may include a plurality of columns and a plurality of rows of individual pixels 168 of image data 166.

As illustrated in FIG. 11B-11D, second sub-frame 452 may be offset from first sub-frame 451 by a vertical distance 200 and a horizontal distance 202, third sub-frame 453 may be offset from first sub-frame 451 by a horizontal distance 204, and fourth sub-frame 454 may be offset from first sub-frame 451 by a vertical distance 206. As such, second sub-frame 452, third sub-frame 453, and fourth sub-frame 454 may be each spatially offset from each other and spatially offset from first sub-frame 451 by respective predetermined distances and/or directions. In one illustrative embodiment, vertical distance 200, horizontal distance 202, horizontal distance 204, and vertical distance 206 are each approximately one-half of one pixel.

As illustrated schematically in FIG. 11E, display device 176 may alternate between displaying first sub-frame 451 in a first position $P_1$, displaying second sub-frame 452 in a second position $P_2$ spatially offset from the first position, displaying third sub-frame 453 in a third position $P_3$ spatially offset from the first position, and displaying fourth sub-frame 454 in a fourth position $P_4$ spatially offset from the first position. More specifically, display device 176 shifts display of second sub-frame 452, third sub-frame 453, and fourth sub-frame 454 relative to first sub-frame 451 by the respective predetermined distances. As such, pixels of first sub-frame 451, second sub-frame 452, third sub-frame 453, and fourth sub-frame 454 overlap each other.

In some embodiments, display device 176 may complete one image cycle by displaying first sub-frame 451 in the first position, displaying second sub-frame 452 in the second position, displaying third sub-frame 453 in the third position, and displaying fourth sub-frame 454 in the fourth position for image frame 178. Thus, second sub-frame 452, third sub-frame 453, and fourth sub-frame 454 may be spatially and temporally displayed relative to each other and relative to first sub-frame 451.

Optionally, the respective sub-frames may be displayed concurrently. For instance, first and second sub-frames may be displayed, followed by third and fourth sub-frames being optically shifted and displayed. A plurality of sub-frames may be imaged simultaneously or sequentially from a single array or a plurality of arrays of imaging elements using fixed optics that provide the appropriate offsets, as described with reference to FIGS. 1-5. More specifically, different sub-frames may be directed along appropriate light paths, such as light paths 96, 98 and 100. Optical elements in the light paths, such as mirrors 106, 108, 110 or 112 may provide the offsets. The display of the offset sub-frames may thus be provided concurrently and/or sequentially, with the relative offsets provided with moving or fixed imaging devices.

FIGS. 12A-12E illustrate an embodiment of completing an image cycle by displaying a pixel 331 from first sub-frame 451 in the first position, displaying a pixel 332 from second sub-frame 452 in the second position, displaying a pixel 333 from third sub-frame 453 in the third position, and displaying a pixel 334 from fourth sub-frame 454 in the fourth position. More specifically, FIG. 12A illustrates display of pixel 331 from first sub-frame 451 in the first position, FIG. 12B illustrates display of pixel 332 from second sub-frame 452 in the second position (with the first position being illustrated by dashed lines), FIG. 12C illustrates display of pixel 333 from third sub-frame 453 in the third position (with the first position and the second position being illustrated by dashed lines), FIG. 12D illustrates display of pixel 334 from fourth sub-frame 454 in the fourth position (with the first position, the second position, and the third position being illustrated by dashed lines), and FIG. 12E illustrates display of pixel 331 from first sub-frame 451 in the first position (with the second position, the third position, and the fourth position being illustrated by dashed lines). Optionally, as has been discussed, sub-frames 331, 332, 333 and 334 may be displayed concurrently to achieve increased image resolution.

Figure 13:
FIG. 13 is a simulation of an enlarged image portion produced without processing by an image display system according to an embodiment of the present invention.
Figure 14:
FIG. 14 is a simulation of an enlarged image portion produced with processing by an image display system according to an embodiment of the present invention.

FIGS. 13 and 14 illustrate enlarged image portions produced from the same image data without and with, respectively, image processing by image display system 160 as illustrated in FIGS. 11 and 12. More specifically, FIG. 13 illustrates an enlarged image portion 214 produced without processing by image display system 160. As illustrated in FIG. 13, areas of enlarged image portion 214 appear relatively pixilated with individual pixels including, for example, pixels forming and/or outlining letters of enlarged image portion 214 being readily visible.

FIG. 14, however, illustrates an enlarged image portion 216 produced with processing by image display system 160. As illustrated in FIG. 14, enlarged image portion 216 does not appear as pixilated compared to enlarged image portion 214 of FIG. 13. Thus, image quality of enlarged image portion 216 is enhanced with image display system 160. More specifically, resolution of enlarged image portion 216 is improved or increased compared to enlarged image portion 214.

In this illustrative embodiment, enlarged image portion 216 is produced by four-position processing including a first sub-frame, a second sub-frame, a third sub-frame, and a fourth sub-frame, as described above. Thus, four times the amount of pixel data is used to create enlarged image portion 216 as compared to the amount of pixel data used to create enlarged image portion 214. Accordingly, with four-position processing, the resolution of enlarged image portion 214 is increased relative to the resolution of enlarged image portion 214 by a factor of two or the square root of four. Four-position processing, therefore, allows image data 166 to be displayed at double the resolution of display device 176 since double the number of pixels in each axis (x and y) gives four times as many pixels.

By defining a plurality of image sub-frames 180 for image frame 178 and spatially displaying image sub-frames 180 relative to each other, image display system 160 can produce displayed image 164 with a resolution greater than that of display device 176, which resolution is also greater than any single sub-frame, as represented by image portion 214. In one illustrative embodiment, for example, with image data 166 having a resolution of 800 pixels by 600 pixels and display device 176 having a resolution of 800 pixels by 600 pixels, four-position processing by image display system 160 with resolution adjustment of image data 166 produces displayed image 164 with a resolution of 1600 pixels by 1200 pixels. Accordingly, with lower resolution image data and a lower resolution display device, image display system 160 can produce a higher resolution displayed image. In another illustrative embodiment, for example, with image data 166 having a resolution of 1600 pixels by 1200 pixels and display device 176 having a resolution of 800 pixels by 600 pixels, four-position processing by image display system 160 without resolution adjustment of image data 166 produces displayed image 164 with a resolution of 1600 pixels by 1200 pixels. Accordingly, with higher resolution image data and a lower resolution display device, image display system 160 can produce a higher resolution displayed image. In addition, by overlapping pixels of image sub-frames 180 while spatially displaying image sub-frames 180 relative to each other, image display system 160 can reduce the "screen-door" effect caused, for example, by gaps between adjacent micro-mirror devices of a light modulator.

By buffering image data 166 to create image frame 178 and decouple a timing of image data 166 from a frame rate of display device 176 and displaying an entire sub-frame 180 for image frame 178 at once, image display system 160 can produce displayed image 164 with improved resolution over the entire image. In addition, with image data of a resolution equal to or greater than a resolution of display device 176, image display system 160 can produce displayed image 164 with an increased resolution greater than that of display device 176. To produce displayed image 164 with a resolution greater than that of display device 176, higher resolution data can be supplied to image display system 160 as original image data or synthesized by image display system 160 from the original image data. Alternatively, lower resolution data can be supplied to image display system 160 and used to produce displayed image 164 with a resolution greater than that of display device 176. Use of lower resolution data allows for sending of images at a lower data rate while still allowing for higher resolution display of the data. Thus, use of a lower data rate may enable lower speed data interfaces and result in potentially less EMI radiation.

While the present disclosure has been provided with reference to the foregoing examples, those skilled in the art will understand that many variations may be made therein without departing from the spirit and scope defined in the following claims. Therefore, the foregoing examples are illustrative, and no single feature, procedure or element is essential to all possible combinations that may be claimed in this or a later application. Moreover, the description is intended to include all novel and non-obvious combinations of elements and actions described herein, and claims may be presented in this or a later application to any novel and non-obvious combination of these elements and actions. Where the claims recite "a" or "another" element or the equivalent thereof, such claims should be understood to include incorporation of one or more such elements, neither requiring nor excluding two or more such elements.

What is claimed is:

1. A method of displaying an image, the method comprising:

receiving image data for the image;

defining a first sub-frame of the image having a plurality of image elements;

defining a second sub-frame of the image having a corresponding plurality of image elements, with each image element of the second sub-frame spatially offset an offset distance from a corresponding image element of the first sub-frame, there being a portion of the image represented by an image element of the second sub-frame and also by at least two image elements of the first sub-frame, wherein the first and second sub-frames represent different portions of the image with a portion of each sub-frame being in common;

displaying the first sub-frame in a first position; and displaying the second sub-frame in a second position, with each displayed image element of the second sub-frame spatially offset substantially the offset distance from the corresponding displayed image element of the first sub-frame.

2. The method of claim 1, where the second sub-frame is offset at least one of a vertical distance and a horizontal distance from the first sub-frame, and where displaying the second sub-frame includes displaying the second sub-frame the at least one of the vertical distance and the horizontal distance from the first sub-frame.

3. The method of claim 1, where displaying the first sub-frame and displaying the second sub-frame include modulating light with a plurality of modulating elements corresponding to the image elements of each sub-frame.

4. The method of claim 1, further including:

defining a third sub-frame of the image and a fourth sub-frame of the image, the fourth sub-frame being spatially offset from the third sub-frame and the third sub-frame and the fourth sub-frame both being spatially offset from the first sub-frame and the second sub-frame; and displaying the third sub-frame in a third position spatially offset from the first position and the second position, and displaying the fourth sub-frame in a fourth position spatially offset from the first position, the second position, and the third position.

5. The method of claim 1, where displaying the first and second sub-frames each includes directing light onto a plurality of modulating elements, and modulating a first plurality of the modulating elements according to the first sub-frame and a second plurality of the modulating elements according to the second sub-frame.

6. The method of claim 5, where directing light onto a plurality of modulating elements includes directing at least one of a red light, a green light, and a blue light.

7. The method of claim 6, where directing light includes directing light of the same color onto the first and second pluralities of modulating elements.

8. The method of claim 6, where directing light includes directing light of different colors onto the first and second plurality of modulating elements.

9. The method of claim 8, where the second sub-frame is offset from the first sub-frame in a first direction, the method further comprising defining a third sub-frame also having a corresponding plurality of image elements, with each image element of the third sub-frame spatially offset a second offset distance in a second direction different than the first direction, and directing light of different colors includes directing a different one of red light, green light, and blue light onto the respective arrays.

10. The method of claim 6, further comprising defining a third sub-frame also having a corresponding plurality of image elements, with each image element of the third sub-frame spatially offset from the first and second sub-frames.

11. The method of claim 5, where directing light includes directing light onto a single array of modulating elements including the first and second plurality of modulating elements.

12. A system for displaying an image, the system comprising:

an image processing unit adapted to receive image data for the image and to define from the image data a first sub-frame of the image having a plurality of image elements and at least a second sub-frame of the image having a corresponding plurality of image elements, each image element of the second sub-frame being spatially offset an offset distance from a corresponding image element of the first sub-frame, there being a portion of the image represented by an image element of the second sub-frame and also by at least two image elements of the first sub-frame, wherein the first and second sub-frames represent different portions of the image with a portion of each sub-frame being in common; and a display device adapted to display the first sub-frame in a first position and the second sub-frame in a second position with each displayed image element of the second sub-frame spatially offset substantially the offset distance from the corresponding displayed image element of the first sub-frame.

13. The system of claim 12, where the image processing unit is adapted to sub-sample the image data and decrease the resolution of the image data.

14. The system of claim 12, where the image processing unit is adapted to interpolate the imagedata and one of increase and decrease the resolution of the image data.

15. The system of claim 12, where the second sub-frame is spatially offset at least one of a vertical distance and a horizontal distance from the first sub-frame, and where the display device is adapted to display the second sub-frame from display of the first sub-frame by the at least one of the vertical distance and the horizontal distance.

16. The system of claim 12, where the display device includes a plurality of modulating elements forming a plurality of image regions, and a light generator configured to direct a light onto each of the plurality of image regions, the display device being adapted to modulate a first image region with the first sub-frame and a second image region with the second sub-frame.

17. The system of claim 16, where the plurality of modulating elements includes a single array of modulating elements forming the first and second image regions.

18. The system of claim 16, where the light includes at least one of a red light band, a green light band, and a blue light band.

19. The system of claim 18, where the light generator is configured to direct light of the same color on the first and second image regions.

20. The system of claim 18, where the light generator is configured to direct light of different colors on the first and second image regions.

21. A system for displaying an image, the system comprising:

means for receiving image data for the image;

means for defining a first sub-frame of the image having a plurality of image elements, and at least a second sub-frame of the image having a corresponding plurality of image elements, with each image element of the second sub-frame spatially offset an offset distance from a corresponding image element of the first sub-frame, there being a portion of the image represented by an image element of the second sub-frame and also by at least two image elements of the first sub-frame, wherein the first and second sub-frames represent different portions of the image with a portion of each sub-frame being in common; and means for displaying the first sub-frame in a first position and the second sub-frame in a second position, with each displayed image element of the second sub-frame spatially offset substantially the offset distance from the corresponding displayed image element of the first sub-frame.

22. The system of claim 21, where the means for displaying the first and second sub-frames is further for directing light onto a plurality of modulating elements, and modulating a first plurality of modulating elements according to the first sub-frame and a second plurality of the modulating elements according to the second sub-frame.

23. Storage media having embodied therein a program of commands adapted to be executed by a computer processor, to:

receive image data for an image;

define a first sub-frame of the image having a plurality of image elements;

define a second sub-frame of the image having a corresponding plurality of image elements, with each image element of the second sub-frame spatially offset an offset distance from a corresponding image element of the first sub-frame, there being a portion of the image represented by an image element of the second sub-frame and also by at least two image elements of the first sub-frame, wherein the first and second sub-frames represent different portions of the image with a portion of each sub-frame being in common;

display the first sub-frame in a first position; and display the second sub-frame in a second position, with each displayed image element of the second sub-frame spatially offset substantially the offset distance from the corresponding displayed image element of the first sub-frame.

* * * * *

UNITED STATES PATENT AND TRADEMARK OFFICE

CERTIFICATE OF CORRECTION

PATENT NO. : 7,317,465 B2
APPLICATION NO. : 10/766641
DATED : January 8, 2008
INVENTOR(S) : Will Allen et al.

It is certified that error appears in the above-identified patent and that said Letters Patent is hereby corrected as shown below:

In column 15, line 53, in Claim 14, delete "imagedata" and insert -- image data --, therefor.

Signed and Sealed this

First Day of July, 2008

JON W. DUDAS
*Director of the United States Patent and Trademark Office*